(No Model.) 6 Sheets—Sheet 1.
E. H. AMET.
AUTOMATIC COIN CONTROLLED TICKET PRINTING WEIGHING SCALE.
No. 387,842. Patented Aug. 14, 1888.
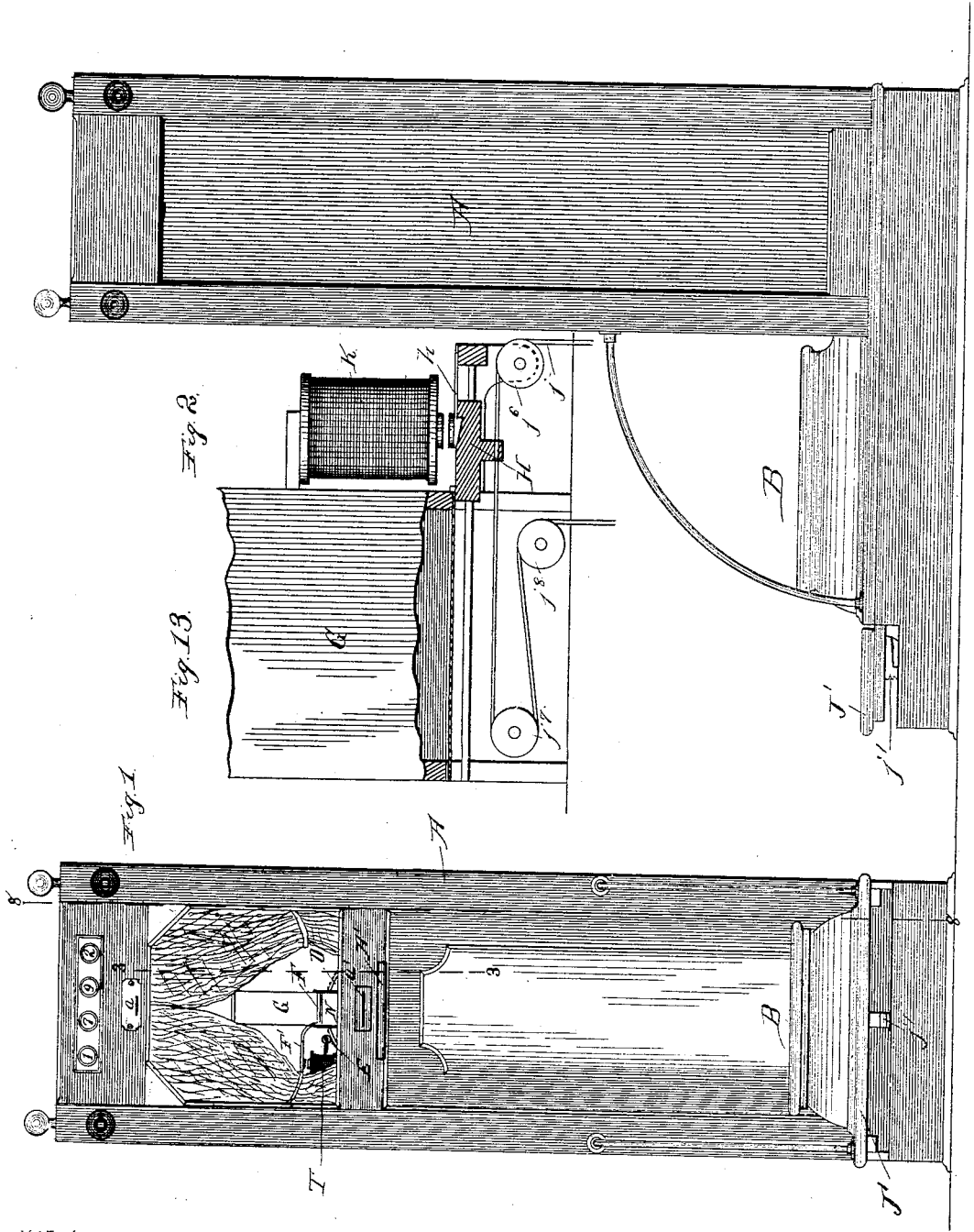
Witnesses:
Sew. C. Curtis.
H. W. Munday.
Inventor:
Edward H. Amet.
By Munday, Evarts & Adcock,
his Att'ys.

(No Model.) 6 Sheets—Sheet 2.
E. H. AMET.
AUTOMATIC COIN CONTROLLED TICKET PRINTING WEIGHING SCALE.
No. 387,842. Patented Aug. 14, 1888.
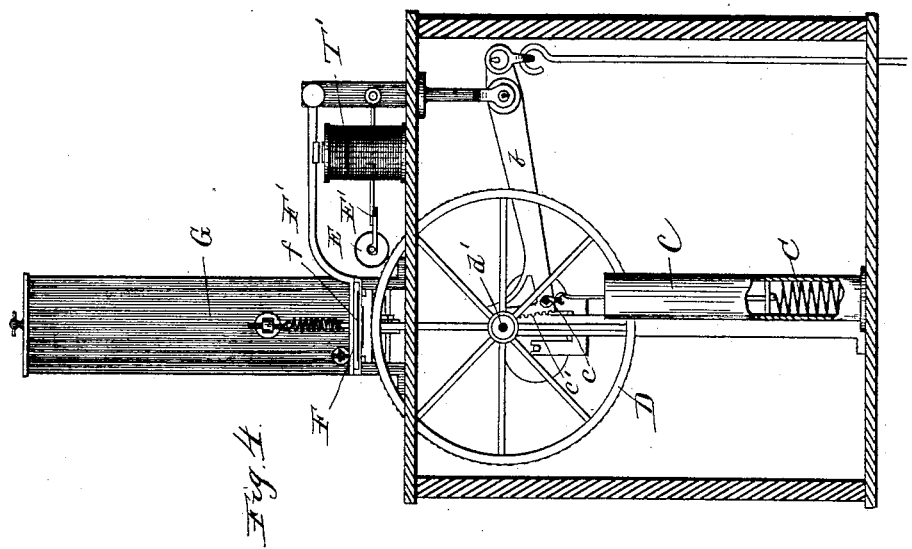
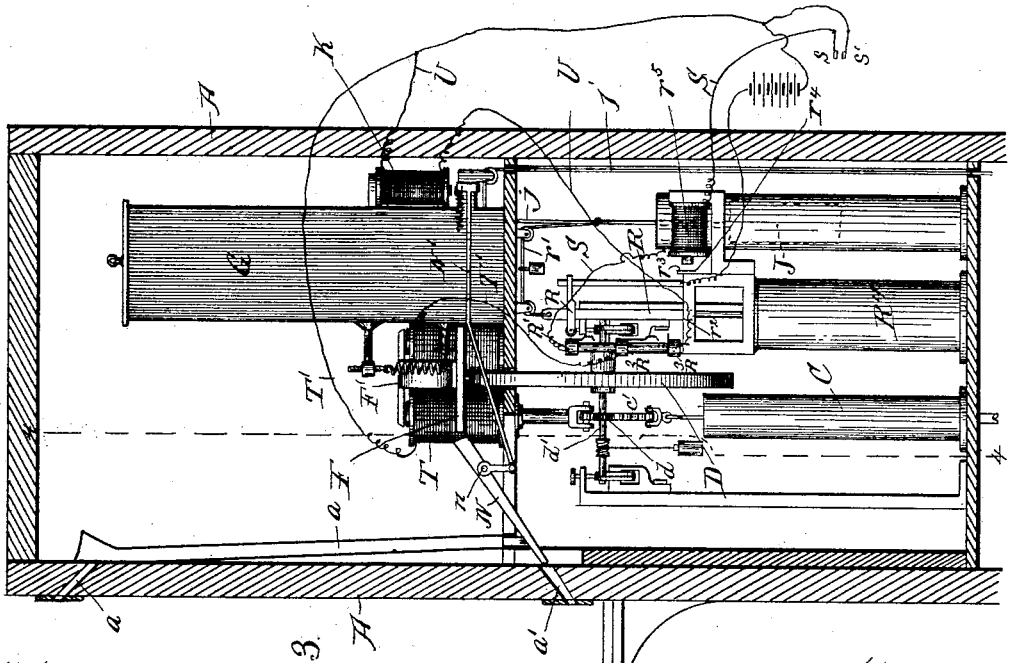
Witnesses:
Lew. C. Curtis.
H. W. Munday
Inventor:
Edward H. Amet.
By Munday, Evarts & Adcock
his Att'y's:

(No Model.) 6 Sheets—Sheet 3.
E. H. AMET.
AUTOMATIC COIN CONTROLLED TICKET PRINTING WEIGHING SCALE.
No. 387,842. Patented Aug. 14, 1888.
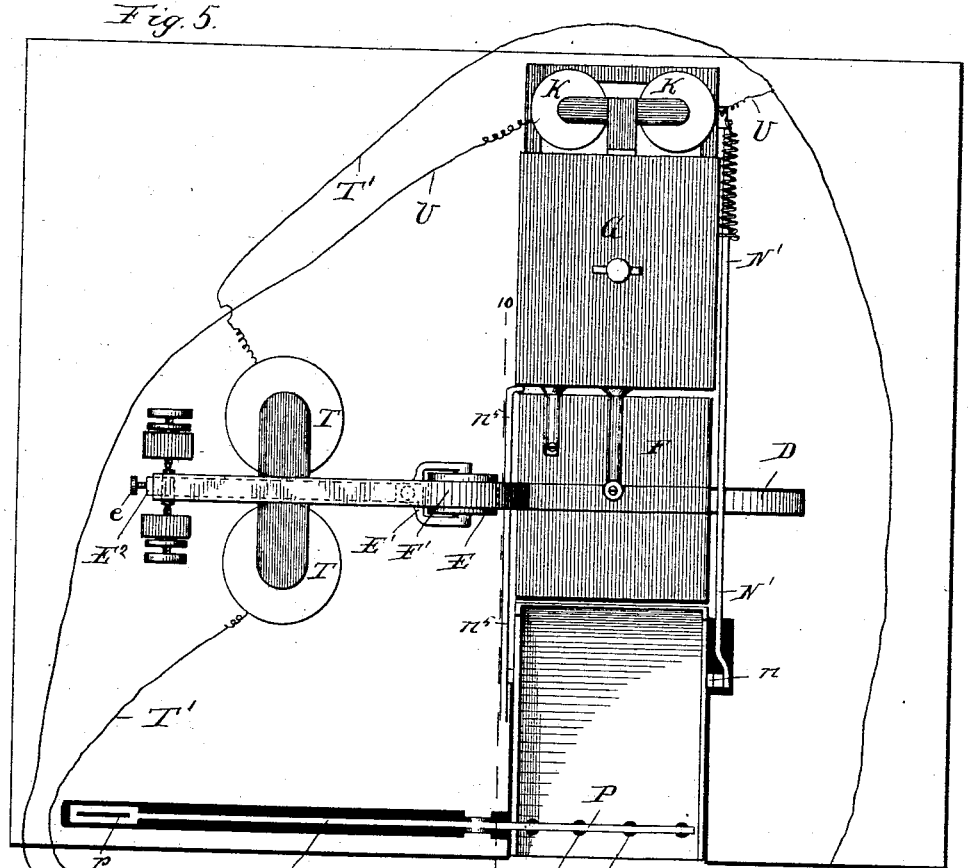
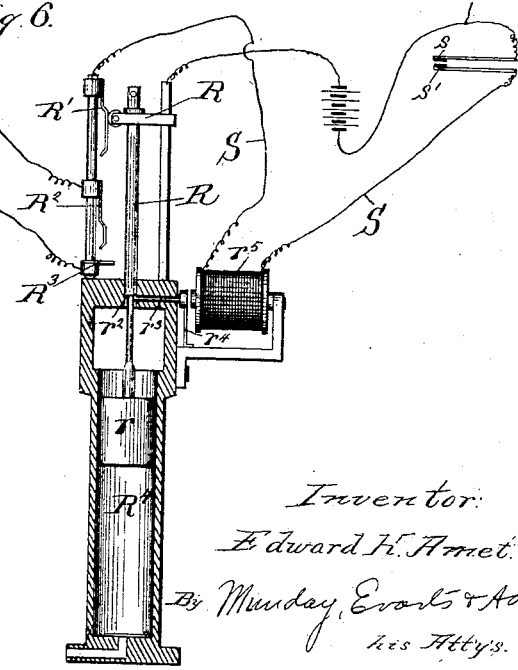
Witnesses:
Geo. C. Curtis.
H. M. Munday.
Inventor:
Edward H. Amet.
By Munday, Evarts & Adcock
his Atty's.

(No Model.) 6 Sheets—Sheet 4.
E. H. AMET.
AUTOMATIC COIN CONTROLLED TICKET PRINTING WEIGHING SCALE.
No. 387,842. Patented Aug. 14, 1888.
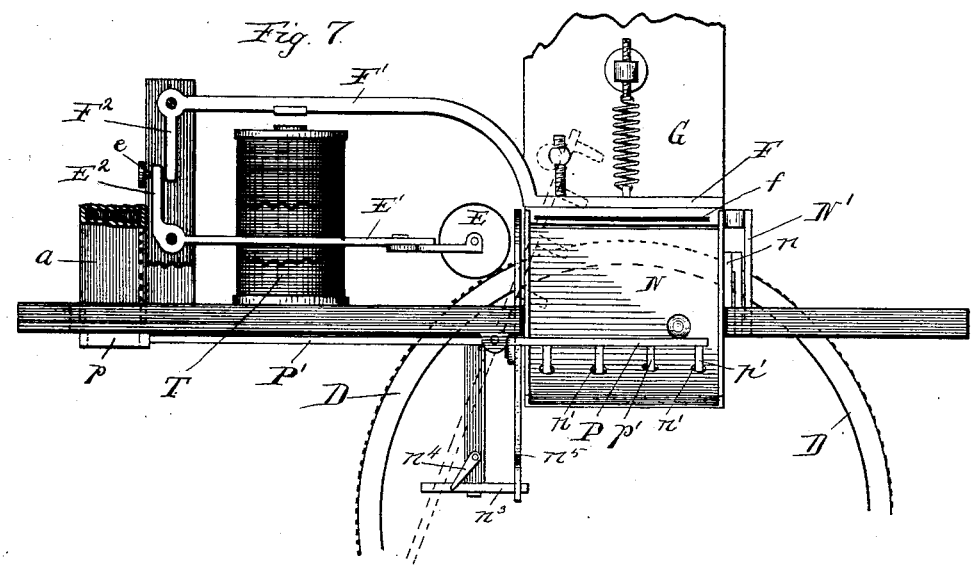
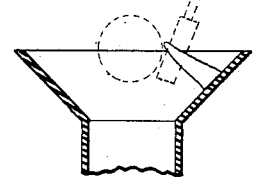
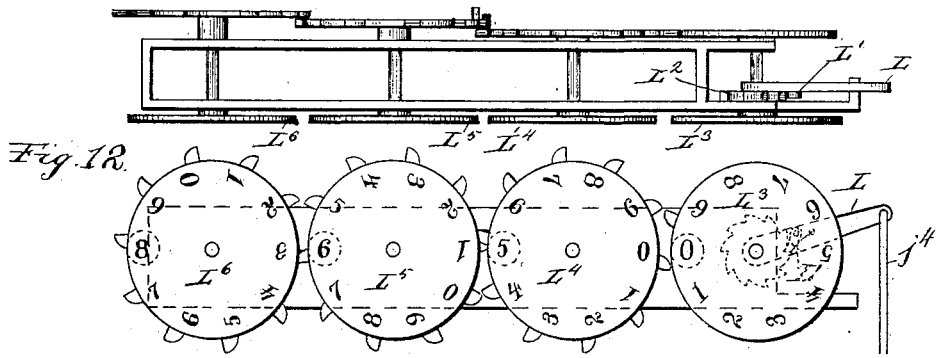
Witnesses:
Geo. E. Curtis.
H. M. Munday
Inventor:
Edward H. Amet.
By Munday, Evarts & Adcock
his Att'ys (No Model.) 6 Sheets—Sheet 5.
E. H. AMET.
AUTOMATIC COIN CONTROLLED TICKET PRINTING WEIGHING SCALE.
No. 387,842. Patented Aug. 14, 1888.
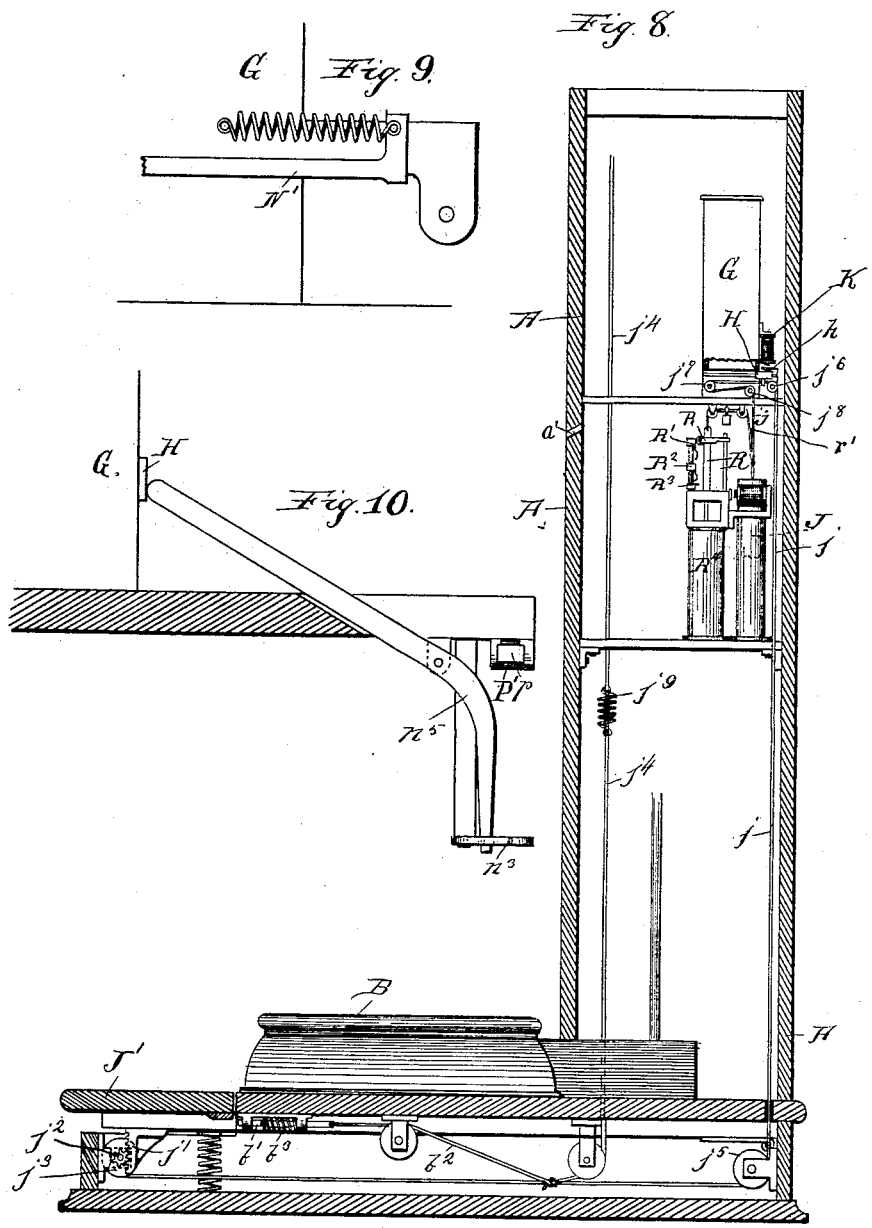

(No Model.) 6 Sheets—Sheet 6.
E. H. AMET.
AUTOMATIC COIN CONTROLLED TICKET PRINTING WEIGHING SCALE.
No. 387,842. Patented Aug. 14, 1888.
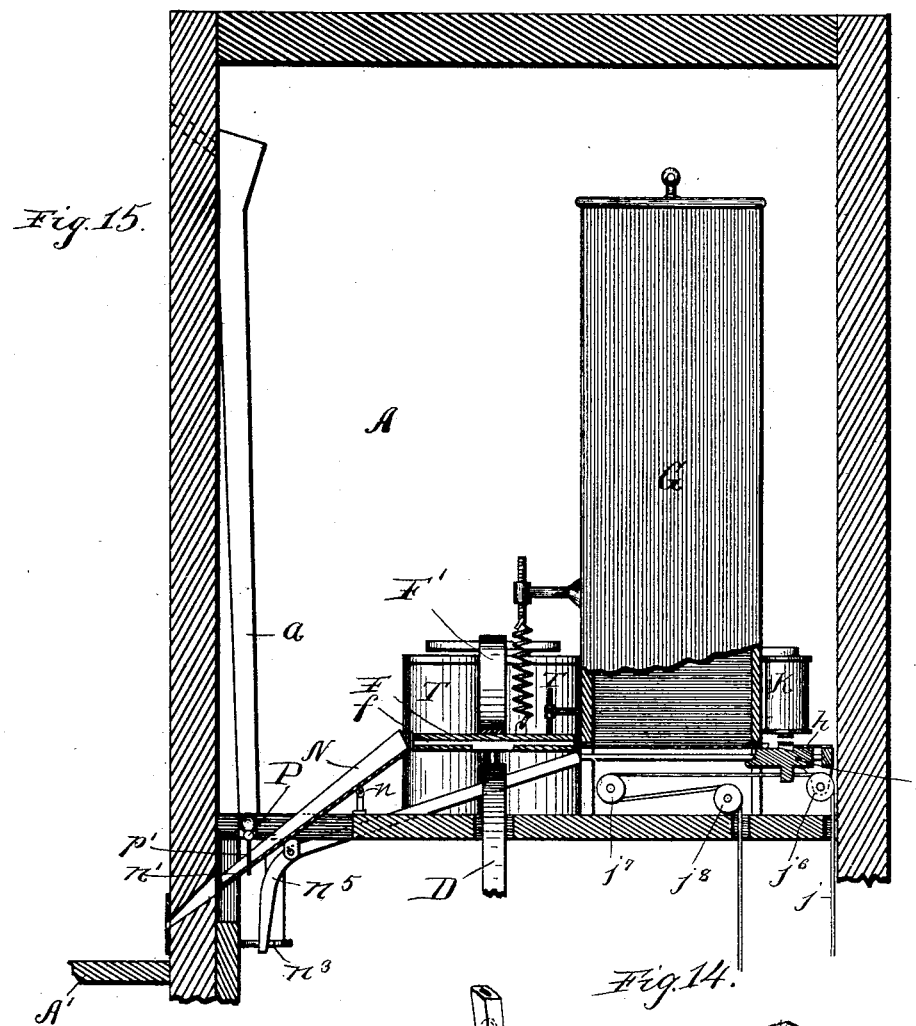
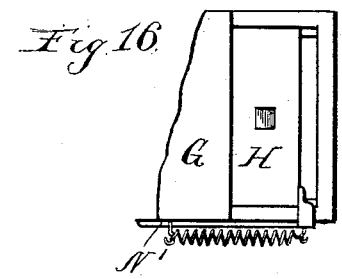
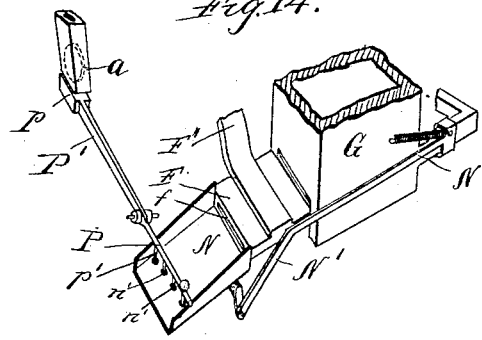
Witnesses:
Lew. E. Curtis.
H. W. Munday.
Inventor:
Edward H. Amet.
By Munday, Evarts & Adcock,
his Attorneys.

UNITED STATES PATENT OFFICE.

EDWARD H. AMET, OF CHICAGO, ILLINOIS, ASSIGNOR TO HIMSELF AND HERBERT A. STREETER, OF SAME PLACE.

AUTOMATIC COIN-CONTROLLED TICKET-PRINTING WEIGHING-SCALE.

SPECIFICATION forming part of Letters Patent No. 387,842, dated August 14, 1888.

Application filed February 17, 1888. Serial No. 264,362. (No model.)

*To all whom it may concern:*

Be it known that I, EDWARD H. AMET, a citizen of the United States, residing in Chicago, in the county of Cook and State of Illinois, have invented a new and useful Improvement in Automatic Coin-Controlled Ticket-Printing Weighing-Scales, of which the following is a specification.

My invention relates to scales designed for automatically weighing a person stepping upon the scale-platform and to print the weight upon a card.

It relates more particularly to improvements upon the automatic weighing-scale shown and described in my pending application No. 252,155, filed October 12, 1887.

My present invention consists in the combination, with an automatic weighing and card-printing scale, of a movable device for controlling the delivery of the printed card out of the machine after the weighing and printing operation has been completed, which movable device or card-delivery mechanism is controlled, moved, or adjusted by a coin to be deposited in a suitable receptacle, whereby the presence or absence of the coin determines whether or not the printed card will be delivered from the machine to the person weighed or deposited inside the inclosing-case of the machine.

My improvement further consists in means for removing the inking-roller from contact with the type-wheel just before the printing-block strikes the wheel to make the impression, thus enabling me to more effectually eliminate the friction of the inking-roller against the type-wheel as an element of error in ascertaining the true weight.

It further consists in certain improvements of the circuit-closing mechanism, whereby I am enabled to employ but a single electric battery for operating or controlling automatically the weighing, inking, printing, and card-feed mechanism.

It further consists in the novel devices and novel combinations of devices herein shown and described, and more particularly pointed out in the claims.

In the accompanying drawings, which form a part of this specification, and in which similar letters of reference indicate like parts, Figure 1 is a front view of a scale embodying my improvement. Fig. 2 is a side elevation. Fig. 3 is a vertical section on line 3 3 of Fig. 1; Fig. 4, a vertical section on line 4 4 of Fig. 3. Fig. 5 is a plan view, and Fig. 6 is a vertical section, of the circuit-closing mechanism, Figs. 5 and 6 together showing also a diagram of the circuits, the lines representing the several circuits in the two figures being joined by dotted or broken lines. Fig. 7 is an enlarged detail elevation showing the coin-operated card-delivery-controlling device. Fig. 8 is a vertical section on line 8 8 of Fig. 1. Fig. 9 is a detail side elevation of parts hereinafter to be described. Fig. 10 is an enlarged detail section on line 10 10 of Fig. 5. Figs. 11 and 12 are detail plan and side views of the registering device for indicating the number of persons weighed, and Fig. 13 is an enlarged sectional view showing the card-feed slide and its operating mechanism. Fig. 14 is a perspective view of the card-delivery chute, the coin-operated lever-gate for closing the card-chute, and showing also the coin-chute whereby the coin is delivered upon the gate-lever. Fig. 15 is an enlarged vertical sectional view, and Fig. 16 is a detail plan view, of the card-feed slide.

In said drawings, A represents the frame or case of the scale. B is the platform; C, its variable counterpoise; *b*, one of the levers connecting the platform with the variable counterpoise, and *c* a link connecting the end of the lever *b* with the counterpoise C. The counterpoise C is what I term a "variable" counterpoise, because it exerts a varying force upon the scale-lever *b* corresponding to the particular weight it counterbalances on the scale-platform. It preferably consists of a coiled spring inside a suitable case, as is fully explained in my former application before referred to. *c'* is the rack on the scale-lever *b*, which operates the gear *d* on the shaft *d'* of the printing-wheel D. F is the impression-block or lever, furnished with a receptacle, *f*, for the card to be printed. G is the card holder or box. H is the card-feed slide, which pushes or feeds the cards one by one out of the card-box into the slot or receptacle *f* of the impression-block F.

J is the weight for reciprocating the card feed slide in one direction. The card-feed slide is retracted by the movable step J' in front of the scale-platform B, which movable step is connected to the weight by a cord, $j$. All these parts are now of an old and well-known construction, and are fully shown and described in my said former application, to which, and the patent when granted therein, reference is hereby made.

As my present invention or improvement does not relate to the particular construction of these parts, it is not deemed necessary to here describe them in detail.

E is an inking-roller mounted on a pivoted lever, E', having a short arm, E², furnished with an adjusting-screw, $e$. The lever F' of the impression-block F is furnished with a short arm, F², which impinges against the short arm of the ink-roller lever and operates to raise the inking-roller from contact with the type-wheel D just before the impression-block strikes the type-wheel to print the card. By the set-screw $e$ the timing of this movement may be readily so adjusted that the inking-roller will remain in contact with the type-wheel and ink the type until the type-wheel nearly reaches the position for printing the true weight, and then the inking-roller will be raised from contact with the type-wheel and allow the type-wheel to reach its true balance without being affected in the least by the friction of the inking-roller thereon. This enables me to weigh and print the true weight with very great accuracy.

The movable step J' in front of the platform B is furnished with a rack, $j'$, which engages a pinion, $j^2$, on the shaft of the card-pulley $j^3$, and thus revolves said pulley and pulls the cord $j$, which extends over or around the pulleys $j^5$ $j^6$ $j^7$ $j^8$, and is connected to the weight J, which operates to push the card-feed slide H forward. The card-feed slide is retracted by the cord $j$, with which it is connected, the same movement of the cord operating also to raise the weight J. The card-feed slide is held in its retracted position by a pawl or catch lever, $h$, which is operated to release said feed-slide by an electro-magnet, K, as is fully shown and described in my former application before referred to, so that the weight J may move said card-feed slide forward. The cord $j$ has a branch cord, $j^4$, connected with the pawl-lever L, the pawl L' of which operates the ratchet-wheel L² on the shaft of the first or units-counting wheel, L³. The units-counting wheel L³ has one tooth and drives the next or tens-counting wheel, L⁴, which drives the succeeding counting-wheels, L⁵ L⁶, so that the number of persons weighed up to nine thousand nine hundred and ninety-nine may be indicated. Any other suitable, equivalent, or well-known counter may be combined in the same way with the scale, so as to indicate the number of persons weighed and coins deposited.

The branch cord $j^4$ is provided with a spring, $j^9$, to allow for any excess of movement in the cord and prevent danger of breaking the same when the step J' descends to its full extent.

The platform B is provided with a spring-bolt, $b'$, which is connected by a branch cord, $b^2$, with the cord $j$. This spring-bolt $b'$ is normally held retracted by the weight J—that is to say, it is so held when the weight J is in its lowest position. When a person steps upon the movable step or table J' and the weight J is raised thereby, the branch cord $b^2$ is of course slackened, and the bolt $b'$ presses with the force of its spring $b^3$ against the smooth end face of the step J'. Now, when the person steps off of the step J' onto the scale-platform B, the weight J being held in its elevated position by the pawl-lever $h$, which acts against the card-feed slide H, the step J' will resume its elevated or normal position, and the spring-bolt will project under the same and hold the step in this position until the weight J again reaches its lowest position and retracts the spring-bolt, at which time the weighing and printing operation will be completed and the printed card pushed out of the impression-block F. The purpose and object of this are to prevent the descent of the weight J being interfered with by persons accidentally stepping upon the step J' during the weighing and printing operation. After the card is printed, it is pushed out of the slot or receptacle $f$ in the impression-block F by the card-feed slide H, which at the same time pushes or feeds a fresh card from the card-box into the impression-block. As the printed card is delivered from the printing-block, it falls upon an inclined chute, N, which is pivoted at $n$ to the frame of the machine. This pivoted or movable chute is connected by a link or rod, N', with the card-feed slide H, (see Figs. 3, 14, and 16,) so that if a printed card is lying upon the chute at the time the card-feed slide is retracted the chute will be turned and the card thereon allowed to drop inside the frame or casing A of the machine.

P is a movable guard or gate which closes the card-delivery chute N and prevents the printed card from being delivered outside of the casing A, except when this gate or guard is raised or removed from the mouth of the chute. This movable gate preferably consists of a pivoted lever having an arm, P', furnished with a coin receptacle or slot, $p$, so that the weight of the coin will raise the lever or gate and permit the printed card to issue from the machine. The casing A is furnished with a coin passage or slot, $a$, through which a coin may be inserted and delivered onto the arm P' of the gate-lever, so as to operate the same. The casing A is also provided with a slot or passage, $a'$, communicating with the chute N when the same is in its normal position, so that the printed card will issue from the machine upon the table or shelf A' when the gate P is raised by the coin.

To prevent the gate P being surreptitiously raised by inserting a knife-blade or other thin article through the card-exit passage $a'$, I provide the gate with one or more teeth or pins, $p'$, which enter corresponding holes, $n'$, in the chute N, so that the gate cannot be raised by any other means than by a coin on the gate-lever. By this means it will be seen that the card with the person's weight printed thereon will not be delivered outside of the casing A of the machine unless a coin is delivered into the machine through the opening $a$. If the coin is not deposited, the person will be weighed and his weight printed on the card; but the printed card will in such case be deposited inside the casing, so that the person weighed cannot get it, because if no coin is deposited the coin-operated gate-lever P' will prevent the delivery of the card from the machine, and when the card-feed slide H is next retracted it will, through the connecting-rod N', tilt the pivoted card-chute N, and thus permit the card to drop down inside the casing A. After the coin is deposited and the gate P raised, in order to hold the gate in its elevated position until the weighing and printing operation is completed and the printed card delivered upon the table A' in position to be readily taken by the person weighed, I provide a horizontally-swinging pawl, $n^3$, having a spring, $n^4$, which holds the gate in its elevated position until the pawl $n^3$ is turned or released by the lever $n^5$, which is operated by the card-feed slide H when the same reaches the limit of its forward movement to push the card out of the machine.

It will of course be understood that the gate P is so pivoted as to be overbalanced and raised by the coin.

R is a movable contact-piece by which the different circuits are opened or closed to operate the machine, and R' R² R³ are the stationary contact-pieces, through which connection is made by the movable contact. This movable contact-piece R has a weight, $r$, or its equivalent to move it one direction, and it is raised by the weight J through a branch cord, $r'$, connecting with the cord $j$. The rod or contact-piece R is furnished with a shoulder or projection, $r^2$, and is held in its elevated position by a spring-armature pin or pawl, $r^3$, operated by a spring, $r^4$, and retracted by a magnet, $r^5$, in the circuit S, the pin $r^3$ having a head which acts as an armature. When a person steps upon the movable step or platform J', the movable contact R being then held in its raised position and the circuit S closed at R', in which position the contact-piece R will be held until the person steps upon the scale-platform B, and thus closes the circuit S at the contact-points $s$ $s'$. The moment this is done the magnet $r^5$ in the circuit S will withdraw the spring-armature pin $r^3$, and thus allow the weighted contact R to descend and make connection successively with the contacts R² R³, and thus closing successively the circuits in which the magnets are included which operate the printing mechanism, and which release the card-feed mechanism, as is clearly shown in Fig. 6, and also in Fig. 3. In order to slow and regulate the descending movement of the weighted contact R, the same is provided with a dash pot, cup, or cylinder, R⁴, the weight $r$ serving as the piston of the dash-pot.

The contact-piece R² is in the circuit T', in which the printing-block-operating magnet T is located, and the contact R³ in a circuit, U, in which the magnet K, for operating the pawl $h$, that releases the card-feed slide H, is included. By this means the several circuits are closed in their proper order and time and but a single battery is necessarily employed for operating each of the magnets.

If preferred, the cards to be printed may be cut off a continuous strip of paper before or after the printing is done.

It should also be observed that my combination of a weighing and printing scale with a coin-operated device for controlling the delivery of the printed card from the machine is not limited to any particular construction of weighing and printing scale or to any particular construction of coin-operated card delivery-controlling device, but may be used in any kind of a printing-scale either electrically or mechanically operated, and with any suitable kind of device for controlling the delivery of the printed card from the machine.

To give the scale an ornamental appearance, I ordinarily provide the case with a glass front, behind which I arrange curtains partially looped back, so as to disclose part of the mechanism.

I hereby disclaim as not of my invention automatic weighing and printing scales wherein a coin inserted in the case is used to operate or release the weighing, printing, or card-feed mechanism—such, for example, as are shown in the patents to Everett, Nos. 336,042 and 336,043, or in the Patents to Clawson, Nos. 366,303, 379,858, and 379,859. In my invention the coin performs no function whatever, either in releasing or operating the mechanism by which the weighing, printing, and card-feeding is done. In my machine all the operations of the scale, including the weighing, card-feeding, card-printing, as well as the delivery of the printed card from the machine, are all performed independently of the coin, and whether a coin is deposited or not all these operations are gone through with. In my machine the coin simply operates to raise a gate or device which closes the passage or chute through which the printed card after being delivered from the machine issues from the case which incloses the machine. The coin in my machine in no way affects the operation of the card-printing scale. It simply opens a gate and permits the printed card to issue from the case which incloses the machine.

I claim—

1. The combination, with an automatic weighing and card-printing scale mechanism, of a case or box, A, inclosing the same, a coin-operated device for controlling the delivery of the printed card from said inclosing case or box, and a movable device whereby the printed card may be discharged inside said case or box if no coin is deposited, substantially as specified.

2. The combination of an automatic weighing and card-printing scale with a box, A, inclosing the same, having a chute, N, through which the printed card may issue, and a coin-operated card-delivery-controlling device or lever, P, having a tooth, $p'$, said chute N having an opening, $n'$, into which said tooth may project, substantially as specified.

3. The combination, with an automatic weighing and card-printing scale having a card-feed mechanism, a printing wheel or type adjusted or controlled by the scale, and a printing mechanism, of a box inclosing the same, furnished with a chute through which the printed card may issue after being delivered from the printing mechanism, and a coin-operated lever for controlling the delivery of the printed card from said box, and a pawl for holding said gate-lever open until the weighing, printing, and card-delivery operations are completed, substantially as specified.

4. The combination, in an automatic weighing and printing scale, of the scale mechananism and the type-wheel adjusted or controlled by the scale mechanism, with an inking device and mechanism for moving the inking device out of contact with the type-wheel momentarily before the impression is taken, so that the type-wheel may reach its true balance unaffected by the friction of the inking device on the type-wheel, substantially as specified.

5. The combination, in an electrically-operated automatic weighing and printing scale, of the scale mechanism and a type-wheel adjusted or controlled by said scale mechanism, two or more electric circuits having magnets included therein, a single battery, a movable contact, and two or more stationary contact-pieces in different circuits closed in succession by the movement of said movable contact-piece, substantially as specified.

6. The combination, with the scale mechanism, of an automatic weighing and card-printing scale, its printing-wheel adjusted or controlled by said scale mechanism, an impression-block, and a card-feed slide, a pivoted chute, a link connecting said chute with the card-feed slide, and a coin-operated gate-lever for opening or closing the mouth of said chute, substantially as specified.

7. The combination, in an automatic electric weighing and printing scale, of the scale and its platform B, movable step $J'$, cord $j$, card-feed slide H, weight J, movable contact R, stationary contacts $R' R^2 R^3$, electric circuits S, U, and T, having magnets included therein, and a catch-pin, $r^3$, operated by the magnet in said circuit S, substantially as specified.

8. The combination, in an automatic electric weighing and printing scale, of the scale and its platform B, movable step $J'$, cord $j$, card-feed slide H, weight J, movable contact R, stationary contacts $R' R^2 R^3$, electric circuits S, U, and T, having magnets included therein, a catch-pin, $r^3$, operated by the magnet in said circuit S, and weight $r$ and dash-pot $R^4$, for controlling the movement of said movable contact R, substantially as specified.

9. The combination, with a weighing and recording scale and its platform and printing mechanism, of a movable step or platform in front of the scale-platform for operating the printing mechanism of the scale by the weight of the person stepping thereon and therefrom onto the scale-platform to be weighed, and a movable pawl or pin, $b'$, mounted on the stationary frame of the machine to hold said movable step in its normal position after the person steps on the scale-platform and until the weighing and printing operation is completed, substantially as specified.

10. The combination of scale-platform B, movable step $J'$, spring-pin $b'$, and mechanism for holding said pin normally retracted, consisting of a cord and a weight, said weight being raised and the cord connecting with said pin slackened during the weighing operation, substantially as specified.

11. The combination of scale-platform B with movable step $J'$, spring-pin $b'$, weight J, cord $j$, branch cord $b^2$, and the weighing and printing mechanism of the scale, substantially as specified.

12. The combination, with a weighing and recording scale, of movable step $J'$, weight J, pulleys and a cord connecting said step and weight, a dash-pot surrounding said weight, and a card-feed slide, H, connected with said cord, a branch cord, $j^4$, and a counter mechanism having an operating pawl-lever connected by said branch cord $j^4$ with said cord, substantially as specified.

EDWARD H. AMET.

Witnesses:
H. M. MUNDAY,
R. H. MUNDAY.